United States Patent
Muilwijk et al.

(10) Patent No.: US 12,296,574 B2
(45) Date of Patent: May 13, 2025

(54) APPARATUS AND METHOD FOR PROCESSING CONSOLIDATED STACKS OF FIBER REINFORCED PLIES

(71) Applicant: Airborne International B.V., s-Gravenhage (NL)

(72) Inventors: Mark Muilwijk, s-Gravenhage (NL); Moiz Ur Rehman, s-Gravenhage (NL); Recep Yaldiz, Geleen (NL); Andries Jakobus Petrus Van Zyl, Bergen op Zoom (NL)

(73) Assignee: Airborne International B.V. (NL)

( * ) Notice: Subject to any disclaimer, the term of this patent is extended or adjusted under 35 U.S.C. 154(b) by 435 days.

(21) Appl. No.: 17/626,760

(22) PCT Filed: Jul. 15, 2020

(86) PCT No.: PCT/NL2020/050465
§ 371 (c)(1),
(2) Date: Jan. 12, 2022

(87) PCT Pub. No.: WO2021/010831
PCT Pub. Date: Jan. 21, 2021

(65) Prior Publication Data
US 2022/0242103 A1      Aug. 4, 2022

(30) Foreign Application Priority Data
Jul. 15, 2019   (NL) ...................... 2023504

(51) Int. Cl.
*B32B 38/18*       (2006.01)
*B29C 37/00*       (2006.01)
(Continued)

(52) U.S. Cl.
CPC .............. *B32B 38/18* (2013.01); *B29C 70/54* (2013.01); *B32B 5/26* (2013.01); *B32B 41/00* (2013.01);
(Continued)

(58) Field of Classification Search
CPC .................. G01N 21/86; G01N 21/95; G01N 2021/8654; B32B 5/26; B32B 38/18;
(Continued)

(56) References Cited

U.S. PATENT DOCUMENTS

| | | | |
|---|---|---|---|
| 11,554,557 B2 * | 1/2023 | Georgeson | ............ B06B 1/0688 |
| 2005/0047643 A1 * | 3/2005 | Lowe | ................. G01N 21/8851 382/141 |

(Continued)

FOREIGN PATENT DOCUMENTS

WO    WO-2012-177340 A1    12/2012

OTHER PUBLICATIONS

International Search Report of Written Opinion, International Application No. PCT/NL2020/050465, dated Nov. 25, 2020, 12 pages.

*Primary Examiner* — Michael A Lyons
(74) *Attorney, Agent, or Firm* — Quarles & Brady LLP (57) ABSTRACT

An apparatus for processing a consolidated stack of fiber reinforced plies, comprising an inspection device, in particular an optical inspection device, arranged to inspect a consolidation state of the stack of fiber reinforced plies, and a handling device arranged to make at least an outer surface of the stack of fiber reinforced plies available for inspection by the inspection device.

19 Claims, 5 Drawing Sheets

(51) Int. Cl.
  *B29C 70/54* (2006.01)
  *B32B 5/26* (2006.01)
  *B32B 41/00* (2006.01)
  *G01N 21/86* (2006.01)
  *G01N 21/95* (2006.01)

(52) U.S. Cl.
  CPC ............. *G01N 21/86* (2013.01); *G01N 21/95* (2013.01); *B29C 2037/90* (2013.01); *B32B 2250/20* (2013.01); *B32B 2260/023* (2013.01); *G01N 2021/8654* (2013.01)

(58) Field of Classification Search
  CPC ................ B32B 41/00; B32B 2250/20; B32B 2260/023; B29C 70/54; B29C 2037/90
  See application file for complete search history.

(56) References Cited

U.S. PATENT DOCUMENTS

2007/0175572 A1* 8/2007 Rubin .................. B29C 70/545
   156/196
2021/0129460 A1* 5/2021 Ur Rehman ............ B29C 70/54

\* cited by examiner

APPARATUS AND METHOD FOR PROCESSING CONSOLIDATED STACKS OF FIBER REINFORCED PLIES

RELATED APPLICATIONS

This application is a 35 U.S.C. § 371 national phase application of PCT/NL2020/050465 (WO 2021/010831), filed on Jul. 15, 2020, entitled "APPARATUS AND METHOD FOR PROCESSING CONSOLIDATED STACKS OF FIBER REINFORCED PLIES", which application claims the benefit of Netherlands Application No. 2023504, filed Jul. 15, 2019, which is incorporated herein by reference in its entirety.

The invention generally relates to processing of stacks of mutually fixated fiber reinforced plies, and in particular to processing consolidated stacks of fiber reinforced plies.

Such stacks are generally known, and may be used for manufacturing fiber reinforced laminated and/or composite products. Typically, such stacks comprise plies that are sequentially laid up in a prescribed order and/or with a particular (directional) alignment. The plies may be mutually fixated together e.g. by spot or friction welding, or may be consolidated together by head and/or pressure to form a (fully) consolidated stack. The plies may e.g. be cut from a sheet of fiber material or be sectioned from a web of fiber material tape. Generally, a fiber reinforced ply comprises a reinforcement in the form of fibers that is embedded in a matrix material. The fibers may e.g. include carbon fibers, aramid fibers or other types of reinforcement fibers, and the matrix material may e.g. include thermosetting resin, or thermoplastic plastics material. The fiber reinforced material may be dry, but may also be wet or impregnated. In addition, the plies or sheets may comprise a backing material.

Fiber reinforced plies are often difficult to handle due to their anisotropic properties. For instance, strength, stiffness and rigidity are mainly provided by the reinforcement, whereas the matrix material typically binds the reinforcements together. As such, e.g. strength and rigidity are mainly present along the fiber direction. Out of plane with respect to the fiber direction, the anisotropic material has relatively low stiffness and is relatively soft and pliable. During handling, layup, and/or consolidation, plies may e.g. wrinkle, crease or tear. Also, plies may become misaligned within the stack, e.g. due to inaccurate placement or mutual shifting between (consecutive) plies during handling, layup, and/or consolidation. Although costly automated processes may be less prone to human error than e.g. manual layup, the aforementioned problems may still arise. Misalignment of plies may be detrimental to the properties of (green) products, and/or undesirable from a quality and/or product tolerance point of view.

Further, during consolidation the matrix material may e.g. swell, run and/or flow out. This, may lead to smudging and/or smearing, in particular at and/or near the periphery of the consolidated stack. Therefore, the periphery of a consolidated stack often comprises irregularities and/or uneven edges. Especially, a freshly, fully consolidated stack often comprises a so-called blubber-periphery, that is to say an irregular periphery e.g. caused by run out of matrix material due to the pressure and/or swelling thereof due to the heat. Such a blubber-periphery a quality and/or product tolerance point of view.

Furthermore, ply properties, i.e. structural and/or material characteristics, may vary between batches of plies, and even within a single batch of plies these properties may vary from ply to ply. These variations may be further amplified when the plies are laid up sequentially in a stack. Due to these variations, consolidation of each stack of fiber reinforced plies may yield different and/or unpredictable results. This may be detrimental to the manufacturing efficiency.

The invention aims to mitigate at least some of the above mentioned drawbacks. In particular, the invention aims to provide an apparatus for processing consolidated stacks of fiber reinforced plies with which the quality, manufacturing efficiency and/or product tolerance may be improved. In particular, an apparatus with which the manufacturing consistency of consolidated stacks of fiber reinforced plies may be improved.

Thereto, the invention provides for an apparatus for processing a consolidated stack of fiber reinforced plies, comprising an inspection device, in particular an optical inspection device, arranged to inspect a consolidation state of the stack of fiber reinforced plies, and a handling device arranged to make at least an outer surface of the stack of fiber reinforced plies available for inspection by the (optical) inspection device.

In the context of this application, the term 'consolidation state' is to be construed as a consolidation process result. The consolidation process may for example comprise at least a partial consolidation of a stack of fiber reinforced plies, such as e.g. localized spot or friction welding plies together to mutually fixate them against translation and/or rotation within the stack. This way, the consolidation state may for instance say something about an alignment of the plies fixated within the stack, e.g. a peripheral alignment and/or a directional alignment of at least the outer surface of the stack of fiber reinforced plies. Preferably, the consolidation process result, and thus the consolidation state, pertains to a fully consolidated stack of fiber reinforced plies that are consolidated together by heat and/or pressure. In this case, the consolidation state may e.g. additionally say something about the quality, integrity and/or tolerance of the consolidated stack. In particular, about e.g. its thickness, fiber orientation, peripheral alignment and/or blubber-periphery.

By arranging an inspection device to inspect a consolidation state of the stack of fiber reinforced plies, the consolidation process result can be assessed, and the quality of the consolidated stack can be estimated. The inspection device may for instance include an optical, a magnetic field, an ultrasonic and/or chromatography device. The optical inspection device may for example be or include a camera, a laser scanner, a 3-D laser scanner, or the like for inspecting the consolidation state of the consolidated stack of fiber reinforced plies. The magnetic field, in particular electromagnetic, inspection device may for example comprise a probe including an emitting and a pickup coil, an emitting coil and an electromagnetic, in particular Hall, sensor, or the like. Due to the magnetic field, eddy currents are caused inside the consolidated stack of fiber reinforced plies, in particular in carbon fibers, and are conducted anisotropically. This way, for example fiber orientation of at least the outer surface of the consolidated stack, flaws, defects and the like may be determined. The inspection device may also comprise inspection devices such as an infrared thermography module, an X-ray device and/or a computed tomography device.

Advantageously, the assessed consolidation state may be registered for comparison and/or to adjust up-/downstream manufacturing process parameters e.g. to improve the consistency of the manufacturing process or to account for statistical deviations from an accumulated statistical threshold acquired during mass production. By collecting information about upstream process settings and assessing the consolidation state of stacks of fiber reinforced plies, a link can be made between upstream process settings and effect on quality. This information can be used to improve the upstream process settings e.g. for consecutive stacks of plies to be consolidated, thereby improving the consistency of the manufacturing process.

By further arranging the handling device to make at least an outer surface of the stack of fiber reinforced plies available for inspection by the inspection device, in particular the optical inspection device, the apparatus can consistently assess the consolidation state of consecutive consolidated stacks in a similar way. By inspecting at least the outer surface of the consolidated stack, peripheral alignment of the stack and/or a degree of the blubbering can be assessed effectively.

The inspection device, in particular the optical inspection device, may be arranged to determine the fiber orientation and/or alignment of the at least outer surface of the stack of fiber reinforced plies as an aspect of the consolidation state. This way, the consolidation state may comprise information about the assessed fiber orientation and/or directional alignment of the outer surface of the stack. In particular, the inspection device may be arranged to determine the fiber orientation on the outer surface and/or through the consolidated stack of fiber reinforced plies. For instance, at least part of the geometry of the consolidated stack may be mapped by determining local orientation field measurements through the consolidated stack. Additionally or alternatively, the fiber orientation and/or alignment may e.g. be determined by an electromagnetic inspection device, an infrared thermography inspection device, an X-ray inspection device and/or chromatography inspection device.

When the optical inspection device is arranged to record a contour of the at least outer surface of the stack of fiber reinforced plies as an aspect of the consolidation state, a peripheral alignment of the stack and/or a degree of the blubbering can be assessed even more effectively.

By providing an emitter, in particular a light source, arranged to highlight the contour of the at least outer surface of the stack of fiber reinforced plies, it can relatively easily be achieved that the contour of the stack is assessed effectively using backlighting. This way, e.g. the background does not have to be filtered out and the contour may be assessed relatively easily.

By providing the handling device with at least one gripper organ arranged to grip the stack of fiber reinforced plies, the stack of fiber reinforced plies may be handled relatively stably and/or securely. In particular, when the at least one gripper organ is arranged to grip an outer surface of the stack of fiber reinforced plies, an opposing outer surface and/or periphery of the stack of fiber reinforced plies may be substantially free of obstructions for inspection by the (optical) inspection device. This way, the consolidation process result may be assessed reliably and/or reproducibly. The at least one gripper organ may e.g. be a vacuum operated gripper for holding the ply against the gripper with a vacuum or an electroadhesive gripper for holding the ply against the gripper with a electrostatic adhesive force between the gripper and the ply.

When the optical inspection device is further arranged to record a position of the stack of fiber reinforced plies relative to the handling device, in particular relative to the gripper organ described above, the position, i.e. placement and/or orientation, of the ply on the handling device may be determined. This way, the recorded position of the stack of fiber reinforced plies may e.g. be translated into a 3D spatial coordinate system of the handling device by applying offsets to the recorded position of the stack or using other techniques, for relatively accurate handling of the stack of fiber reinforced plies.

When the optical inspection device is further arranged to record an image of the inspected consolidation state of the stack of fiber reinforced plies and to project a selected reference projection onto the recorded image of the inspected consolidation state of the stack based on at least one aspect of the consolidation state, the inspected consolidation state may relatively easily be compared to e.g. a selected reference projection of a desired consolidation state. Thereby, a deviation from the desired consolidation state may be assessed relatively efficiently while e.g. taking the fiber orientation and/or alignment of the at least outer surface of the stack into account. In particular, the selected reference projection may include a reference geometry of a green product. This way, the selected reference projection of the green product may be digitally overlaid on the inspected consolidation state of the stack of fiber reinforced plies to obtain a relatively high degree of spatial overlap between e.g. the contour of the at least outer surface of the stack and the selected reference projection. Thereby, the degree of spatial overlap may be improved while taking at least one aspect of the consolidation state into account. Further, the reference projection may be selected from an adjustable database of reference projections or may e.g. be based on a user's input to the apparatus.

By providing a customizing device arranged to customize the stack of fiber reinforced plies to include a preferred reference geometry at least partially based on at least one aspect of the consolidation state, the preferred reference geometry may be applied to the stack of fiber reinforced plies, e.g. to form a green product. When the handling device is arranged to provide the stack of fiber reinforced plies to the customizing device, the stack of fiber reinforced plies may conveniently be transported from the inspection device to the customizing device. In particular, the handling device may provide the stack of fiber reinforced plies in a manner necessary for including the preferred reference geometry. Thereby, the efficiency of the manufacturing process may be improved.

When the customizing device is a machining device that is arranged to machine the stack of fiber reinforced plies along at least one side thereof, in particular a single side thereof, to include a straight reference edge, a relatively easy-to-recognize and/or use point of reference may be applied to the stack, such as reference edge for positioning the consolidated stack for assembling e.g. a phone casing or laptop cover. Additionally or alternatively, the machining device may be arranged to machine the stack of fiber reinforced plies to include a reference recess and/or reference through hole, in particular of various shapes and sizes.

Optionally, the at least one aspect of the consolidation state is the fiber orientation, such that, during use, the selected reference projection is projected parallel or perpendicular to the fiber orientation of the at least outer surface of the stack.

When the inspection device is configured to minimize the amount of material to be scrapped based on the overlap between the reference projection and at least the contour aspect of the consolidation state, the amount of scrap material may be reduced while ensuring product tolerances e.g. for finished products, further processing steps or assembly.

By providing a second handling device, wherein the handling device and the second handling device cooperate to form a handover arrangement for handing over the consolidated stack of fiber reinforced plies therebetween, the consolidated stack of fiber reinforced plies may be inspected from different angles. For example, the handover arrangement may be configured such that the second handling device makes at least an opposed outer surface of the stack of fiber reinforced plies available for inspection by the optical inspection device. This way, the inspection device may have a substantially unobstructed view of at least the opposed outer surface of the stack. When a handover point of engagement on the consolidated stack is based on at least one aspect of the consolidation state, the position (placement and/or orientation) of the stack of fiber reinforced on the second handling device may be adjusted during handing over. In particular, the handover point of engagement may be corrected by taking the alignment of the fiber orientation and/or the contour into account. Thereby, the second handling device may e.g. precisely provide the stack of fiber reinforced plies to the customizing device to include the preferred reference geometry or make the stack available for inspection by the optical inspection device to verify a previously applied, preferred reference geometry using the (other) handling device in a verification step. Additionally or alternatively, the second handling device may provide the stack to the customization device to correct the preferred reference geometry and/or to provide an additional preferred reference geometry, such as a further straight reference edge, reference recess and/or reference through hole.

The handling device and/or the second handling device may be arranged to manipulate the stack of fiber reinforced plies into a planar orientation such that the stack of fiber reinforced plies can be made available for a thickness measurement by the optical inspection device or a further inspection device. In particular, the optical inspection device may comprise a laser scanner arranged to make at least a partial 3-D scan of at least the outer surface of the stack of fiber reinforced plies in planar orientation. This allows the optical inspection device to e.g. determine a thickness and/or flatness of the stack, e.g. by analyzing the at least partial 3-D scan or topography of at least the outer surface of the stack of fiber reinforced plies. The laser scanner may for example consecutively or simultaneously inspect opposing outer surfaces of the consolidated stack of fiber reinforced plies.

Advantageously, the further inspection device may be or comprise a thickness gauge, wherein during the thickness measurement at least one of the handling devices and the thickness gauge may move relative to each other along a predetermined path to allow a multiple point thickness measurement of the consolidated stack of fiber reinforced plies, in particular along an H- or M-shaped path. In particular, the thickness gauge may include aligned, opposing laser scanners that are facing each other and that are spaced apart along an aligned axis to allow the consolidated stack of fiber reinforced plies to pass through.

Advantageously, the apparatus may further comprise a nondestructive inspection device arranged to identify defects, such as delamination, cracks, pockets and voids, in the stack of fiber reinforced plies, as an aspect of its the consolidation state. For example, nondestructive inspection devices such as acoustic or sonic devices e.g. for ultrasonic testing and radiographic devices e.g. for x-ray and/or neutron inspection of internal details of the consolidated stack. The nondestructive inspection device may comprise an ultrasonic inspection device including a probe including an emitter for emitting signals on the consolidated stack of fiber reinforced plies and a detector for detecting reflected signals from the consolidated stack of fiber reinforced. The detected reflected signals may be used to e.g. inspect flaws, defects, thickness, fiber alignment, and the like. Additionally or alternatively, thermographic inspection devices may be used.

The consolidation state may be or comprise at least one of the following from the non-limitative list: the fiber orientation, the alignment, the thickness, the contour, and/or defects of the stack of fiber reinforced plies.

The invention further relates to a method for processing a consolidated stack of fiber reinforced plies, in particular with an apparatus including features as discussed above, comprising the steps of making an outer surface of the stack of plies available to an optical inspection device, and inspecting a consolidation state of the stack of fiber reinforced plies using the optical inspection device.

Advantageously, the method may further comprise the steps of recording data on the consolidation state of the stack of fiber reinforced plies, comparing at least one aspect of the consolidation state of the stack of fiber reinforced plies to an expected consolidation state of the stack of fiber reinforced plies based on recorded parameters of individual plies in the stack of fiber reinforced plies and/or upstream consolidation process parameters, and adjusting the upstream production, in particular consolidation, process parameters based on a deviation between the at least one aspect of the consolidation state and the expected consolidation state of the stack of fiber reinforced plies.

The method may also comprise the step of customizing the stack of fiber reinforced plies to include a preferred reference geometry at least partially based on at least one aspect of the consolidation state, and providing the stack of fiber reinforced plies to a customizing device, in particular in a manner necessary for including the preferred reference geometry based on at least one aspect of the consolidation state of the stack of fiber reinforced plies.

Especially, the method may comprise the steps of customizing the stack of fiber reinforced plies to include a preferred reference geometry at least partially based on at least one aspect of the consolidation state, and providing the stack of fiber reinforced plies to a customizing device, in particular in a manner necessary for including the preferred reference geometry. This way, the stack of fiber reinforced plies may be machined along at least one side thereof, in particular a single side thereof, by the customizing device to include a straight reference edge and/or to include a reference recess and/or reference through hole.

The invention further relates to a consolidated stack of fiber reinforced plies, in particular manufactured with an apparatus and/or method including features as discussed above, comprising a stack of superimposed sheets of fiber reinforced material, in particular anisotropic sheets having reinforcement fibers embedded in a matrix material, which sheets have been mutually consolidated together by heat and/or pressure into a fixed, in particular rigid, stack of fiber reinforced plies comprising a preferred reference geometry, in particular wherein the preferred reference geometry comprises at least one machined side, in particular a single machined side, presenting a straight reference edge, and/or at least one reference recess, and/or at least one reference through hole.

Further advantageous aspects of the invention are set out in the description and appended claims.

It will be clear to the skilled person that the technical features of the present apparatus elucidated in the above paragraphs can be advantageously used for processing a consolidated stack of fiber reinforced plies. The technical features described in the paragraphs can be isolated from the context, and the isolated technical features from the different paragraphs can be combined. Such combinations are herewith specifically disclosed in this description.

The invention will be further elucidated on the basis of a non limiting exemplary embodiment, which is represented in the drawings. In the drawings.

It is noted that the drawings are only schematic representations of a preferred embodiment of the invention. In the drawings, identical or corresponding parts are represented with the same reference numerals.

Figure 1:
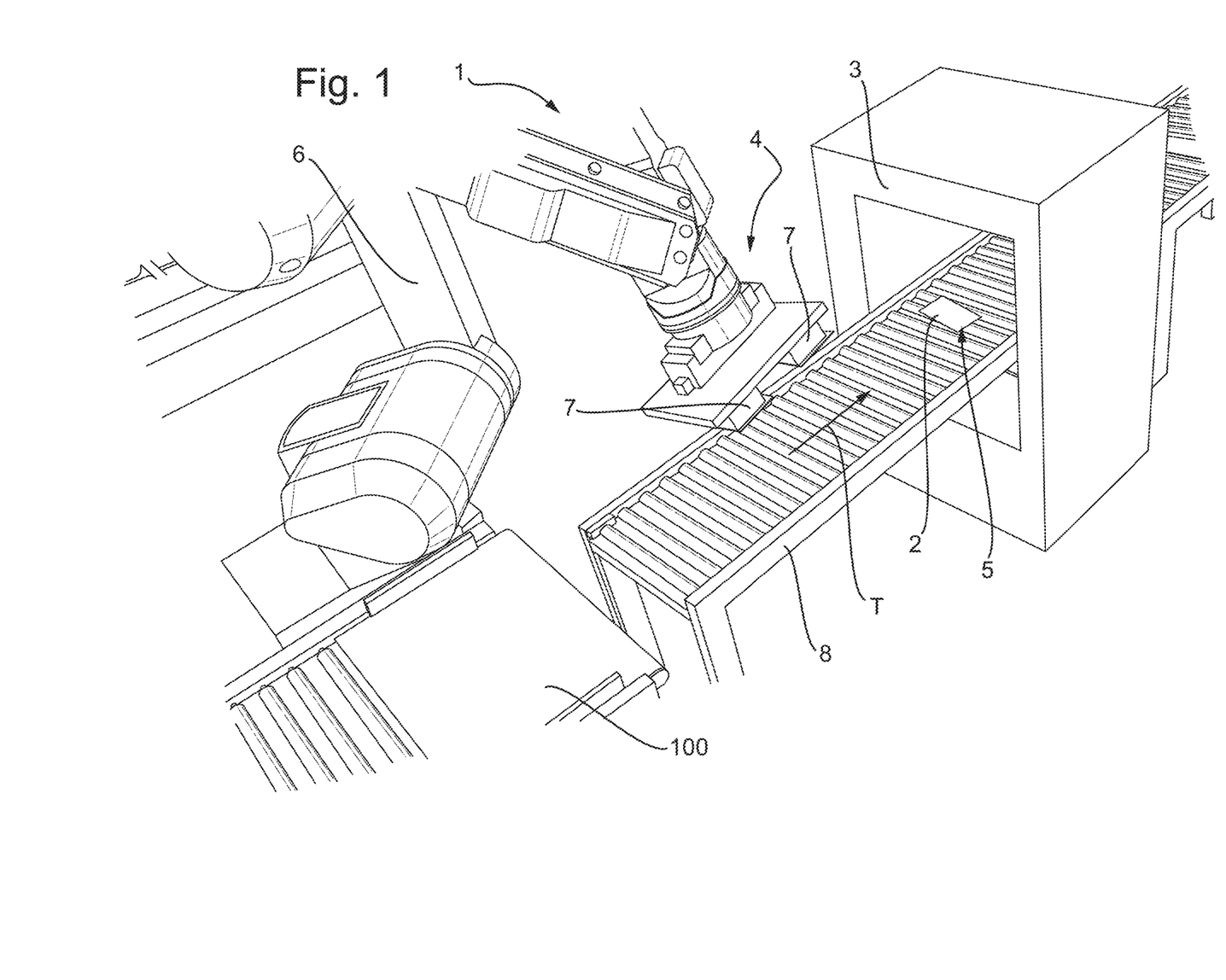
FIG. 1 shows a schematic perspective view of a part of an apparatus according to an aspect of the invention.

FIG. 1 shows part of an apparatus 1 for processing a consolidated stack of fiber reinforced plies 2. The apparatus 1 comprises an inspection device 3 arranged to inspect a consolidation state S of the consolidated stack of fiber reinforced plies 2. In the exemplary embodiment illustrated, the inspection device 3 is an optical inspection device such as a camera or laser scanner that is arranged to determine the fiber orientation, contour C and/or alignment of the at least outer surface of the consolidated stack 2 as an aspect of the consolidation state S. A handling device 4 is arranged to make at least an outer surface 5 of the consolidated stack of fiber reinforced plies 2 available for inspection by the optical inspection device 3. In the exemplary embodiment, the handling device 4 comprises a robot arm 6 with two gripper organs 7 each arranged to grip an outer surface 5 of consolidated stacks 2. Alternatively, the handling device 4 may be provided with one, three, four or more gripper organs. The handling device 4 further includes a transportation track 8 that transports consolidated stacks of fiber reinforced plies 2 in a substantially planar orientation in a transportation direction T along the optical inspection device 3. The robot arm 6 with the two gripper organs 7 transfers consolidated stacks 2 from a feed associated with an output 100 of a consolidation station (not shown) to the transportation track 8. The optical inspection device 3 is arranged above the transportation track 8 such that it may inspect the outer surface 5 of the consolidated stack.

Additionally or alternatively, the robot arm 6 may make at least the outer surface 5 of the consolidated stack of fiber reinforced plies 2 available for inspection by the optical inspection device 3 or consolidated stacks 2 may pass directly from the feed associated with the output 100 of the consolidation station to a transportation track 8 without the robot arm 6.

Figure 2:
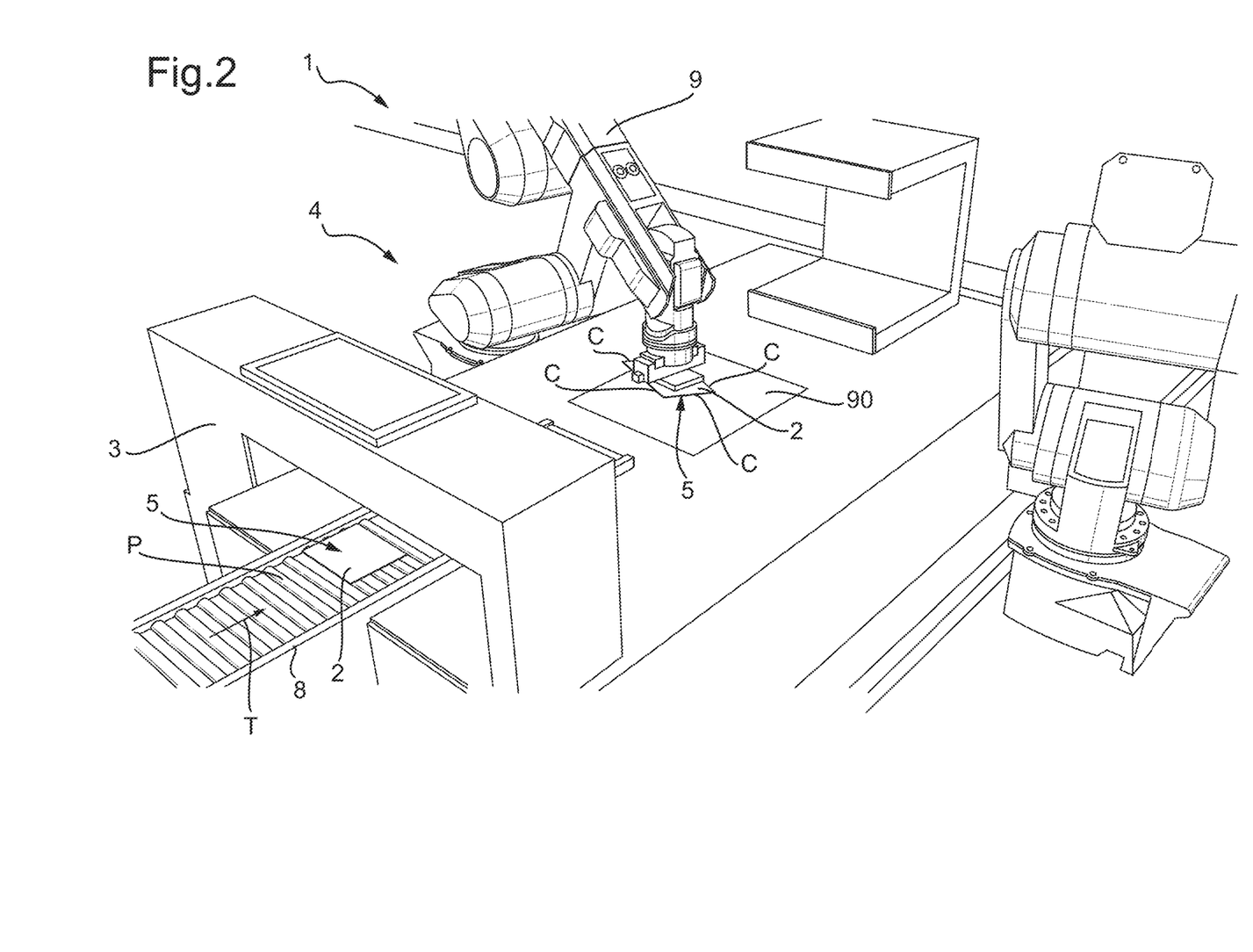
FIG. 2 shows a schematic perspective view of the apparatus of FIG. 1 according to a further aspect of the invention.
Figure 3:
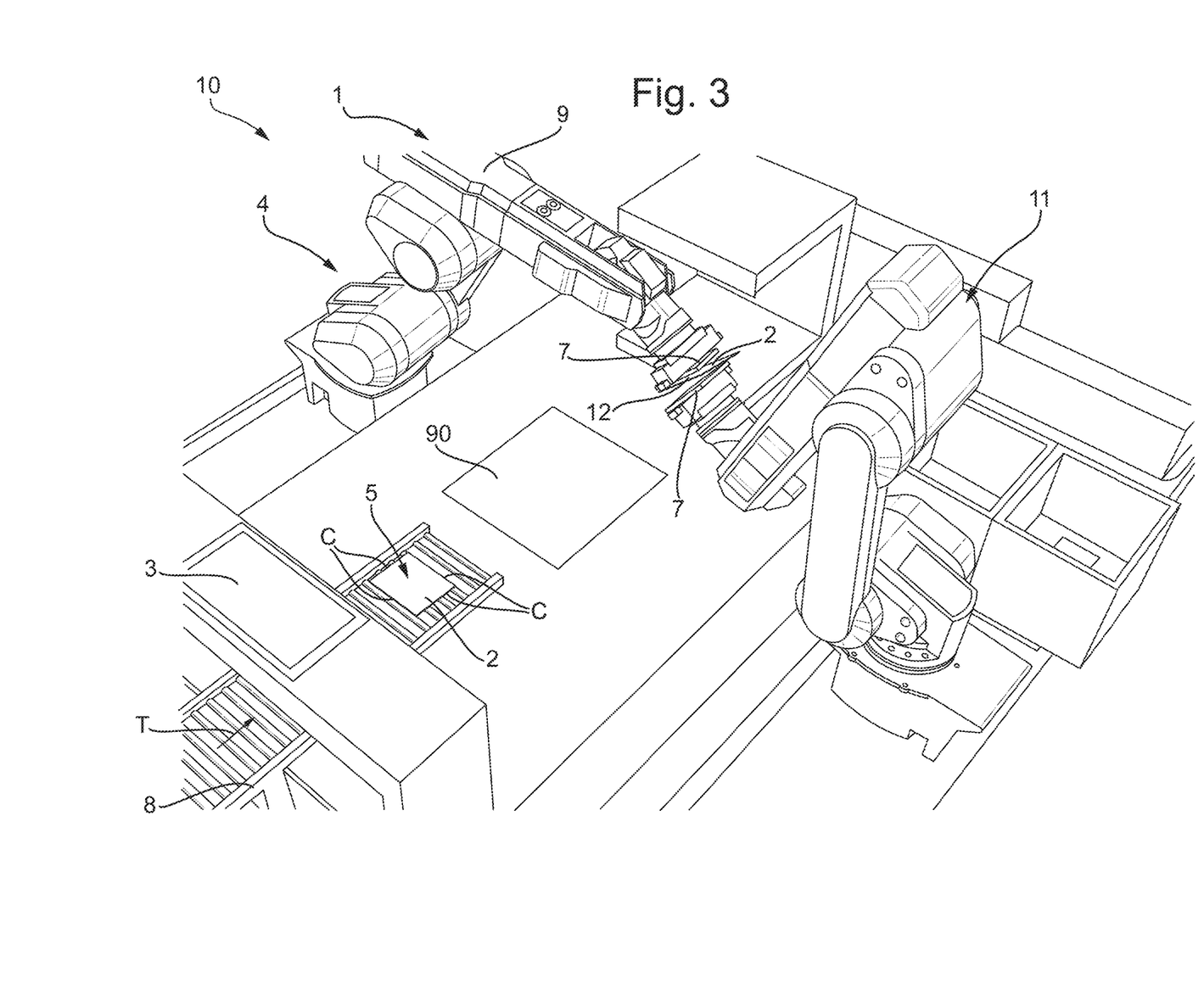
FIG. 3 shows a schematic perspective view of the apparatus of FIG. 1 according to another aspect of the invention.
Figure 4:
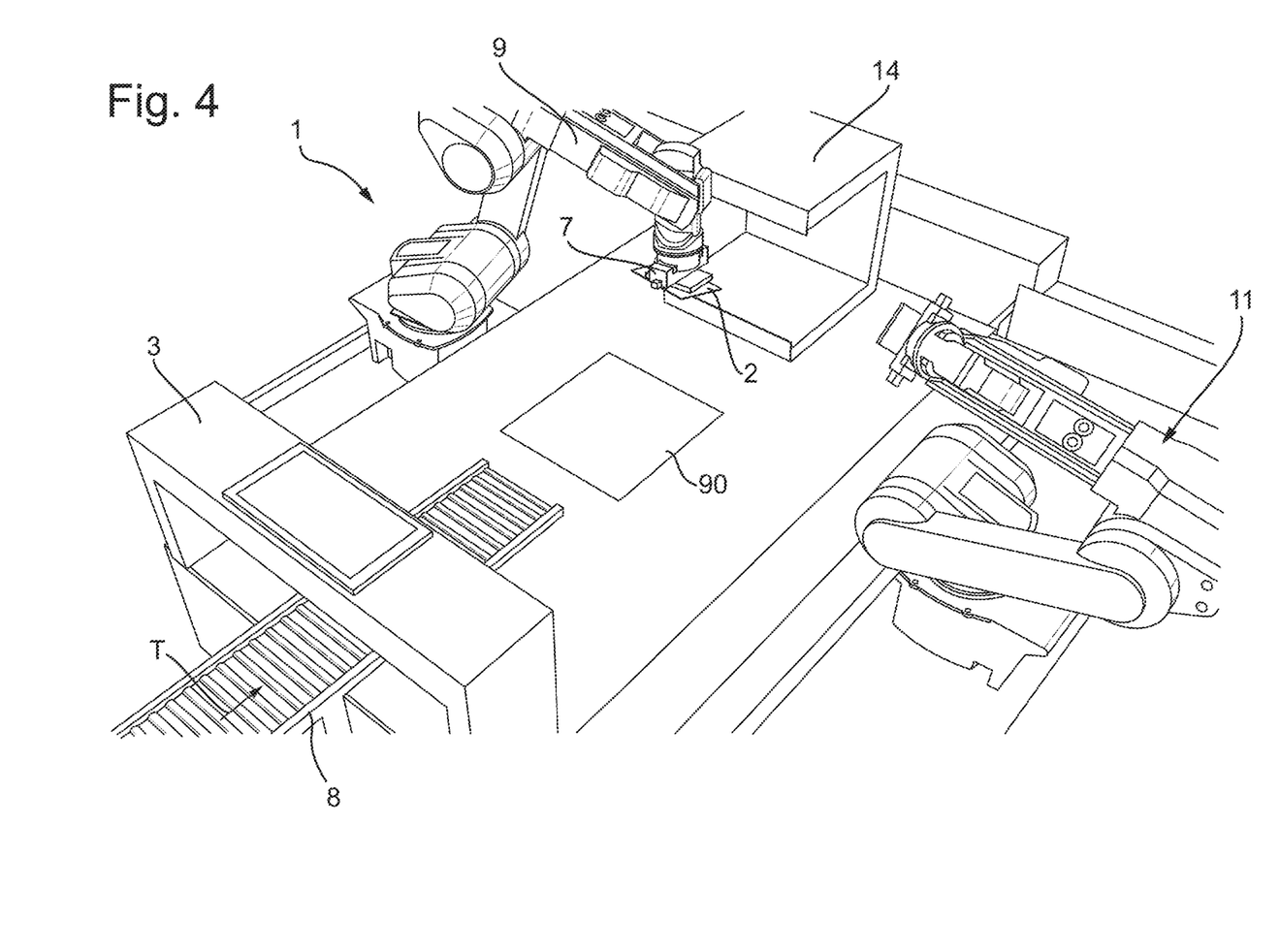
FIG. 4 shows a schematic perspective view of the apparatus of FIG. 1 according to a supplementary aspect of the invention.

Referring to FIGS. 2-4, the transportation track 8 and inspection device 3 of FIG. 1 are illustrated together with a further part of the apparatus 1. In FIG. 2, the handling device 4 is provided with a further robot arm 9 with at least one gripper organ 7, e.g. one, two, three, four or more, that grips the outer surface 5 of the consolidated stack 2. Here, the handling device 4, in particular the robot arm 9, lifts the consolidated stack 2 from the transportation track 8 and makes the consolidated stack 2 available to an emitter 90, in particular in a planar orientation. The emitter 90 is arranged to highlight and record the contour C of the at least outer surface 5 of the consolidated stack of fiber reinforced plies 2. Alternatively, the emitter 90 may be provided on the optical inspection device 3 as a light source to highlight said contour C such that the optical inspection device 3 may record it.

The optical inspection device 3 is further arranged to record a position, i.e. location and orientation, of the consolidated stack of fiber reinforced plies 2 relative to the at least one gripper organ 7. In the shown embodiment, the optical inspection device 3 is provided with a camera facing away from a transport plane P of the transportation track 8 that extends along the transportation direction T.

The optical inspection device 3 records images of the inspected consolidation state S of the stack of fiber reinforced plies 2 and projects a selected reference projection onto said recorded image (not shown). The selected reference projection may be obtained from a (remote) database that is coupled to the apparatus 1, e.g. via a physical or wireless connection.

Figure 5:
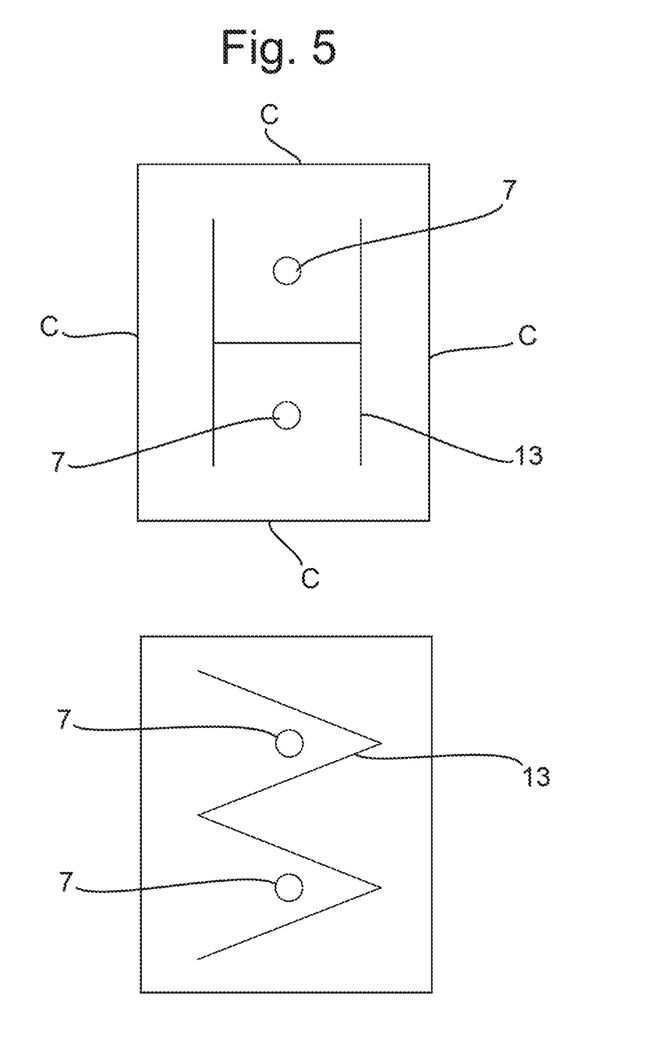
FIG. 5 shows a schematic top view of a thickness measurement of a consolidated stack of fiber reinforced plies according to an aspect of the invention.

FIG. 3 shows a handover arrangement 10 for handing over the consolidated stack of fiber reinforced plies 2 between the handling device 4 and a second handling device 11. The second handling device 11 includes a second robot arm with at least one gripper organ 7. A handover point of engagement 12 on the consolidated stack 2 is based on at least one aspect of the consolidation state S. Either or both of the handling devices 4, 11 are arranged to manipulate the consolidated stack 2 into a planar orientation such that said stack 2 may be made available for a thickness measurement, e.g. a multiple point thickness measurement along an H- or M-shaped path 13 (FIG. 5).

FIG. 4 illustrates the handling device 4, in particular the further robot arm 9, presenting the consolidated stack of fiber reinforced plies 2 to a customizing device 14. Here, the customizing device includes a laser beam that machines the consolidated stack 2 along a single side thereof. Additionally or alternatively, for example a water jet, cutter, milling- and/or rotary tool may be used to machine the consolidated stack 2.

As for the scope of this disclosure, it is pointed out that technical features which have been specifically described may be susceptible of a functional generalization. Furthermore, it is pointed out that—as far as not explicitly indicated—such technical features can be seen separately from the context of the given exemplary embodiment, and furthermore can be seen separately from the technical features with which they cooperate in the context of the example.

As for the scope of protection, it is pointed out that the invention is not limited to the exemplary embodiment represented here, and that many variants are possible. For example, other ways for. Such variants will be clear to the skilled person and are understood to fall within the scope of the invention as set forth in the following claims.

LIST OF REFERENCE SIGNS

1. Apparatus
2. Consolidated stack of fiber reinforced plies
3. Inspection device
4. Handling device
5. At least an outer surface of the consolidated stack
6. Robot arm
7. Gripper organ
8. Transportation track
9. Further robot arm
10. Handover arrangement
11. Second handling device 12. Point of engagement
13. H- or M-shaped path
14. Customizing device
100. feed associated with output of consolidation station
S. Consolidation state
C. Contour
T. Transportation direction
P. Transport plane that extends along the transportation direction

The invention claimed is:

1. An apparatus for processing a consolidated stack of fiber reinforced plies, comprising:
    an inspection device arranged to inspect a consolidation state of the stack of fiber reinforced plies;
    a handling device arranged to make at least an outer surface of the stack of fiber reinforced plies available for inspection by the inspection device.

2. The apparatus according to claim 1, wherein the inspection device is arranged to determine the fiber orientation and/or alignment of the at least outer surface of the stack of fiber reinforced plies as an aspect of the consolidation state.

3. The apparatus according to claim 1, wherein the inspection device is arranged to record a contour of the at least outer surface of the stack of fiber reinforced plies as an aspect of the consolidation state.

4. The apparatus according to claim 1, comprising an emitter arranged to highlight a contour of the at least outer surface of the stack of fiber reinforced plies.

5. The apparatus according to claim 1, wherein the handling device comprises at least one gripper organ arranged to grip the stack of fiber reinforced plies.

6. The apparatus according to claim 1, wherein the inspection device is further arranged to record a position of the stack of fiber reinforced plies relative to the handling device.

7. The apparatus according to claim 1, wherein the inspection device is further arranged to record an image of the inspected consolidation state of the stack of fiber reinforced plies and to project a selected reference projection onto the recorded image of the inspected consolidation state of the stack based on at least one aspect of the consolidation state.

8. The apparatus according claim 7, wherein the at least one aspect of the consolidation state is the fiber orientation, such that, during use, the reference projection is projected parallel or perpendicular to the fiber orientation of the at least outer surface of the stack.

9. The apparatus according to claim 7, wherein the reference projection is configured to minimize the amount of material to be scrapped based on the overlap between the reference projection and at least the contour aspect of the consolidation state.

10. The apparatus according to claim 1, comprising a customizing device arranged to customize the stack of fiber reinforced plies to include a preferred reference geometry at least partially based on at least one aspect of the consolidation state, wherein the handling device is arranged to provide the stack of fiber reinforced plies to the customizing device.

11. The apparatus according to claim 10, wherein the customizing device is a machining device that is arranged to:
    machine the stack of fiber reinforced plies along at least one side thereof to include a straight reference edge; and/or
    machine the stack of fiber reinforced plies to include a reference recess and/or reference through hole.

12. The apparatus according to claim 1, comprising a second handling device, wherein the handling device and the second handling device cooperate to form a handover arrangement for handing over the consolidated stack of fiber reinforced plies therebetween, and wherein a handover point of engagement on the consolidated stack is based on at least one aspect of the consolidation state.

13. The apparatus according to claim 12, wherein the handling device and/or the second handling device is/are arranged to manipulate the stack of fiber reinforced plies into a planar orientation such that the stack of fiber reinforced plies is made available for a thickness measurement by the inspection device or a further inspection device.

14. The apparatus according to claim 13, wherein the further inspection device is or comprises a thickness gauge, wherein during the thickness measurement at least one of the handling devices and the thickness gauge move relative to each other along a predetermined path to allow a multiple point thickness measurement of the consolidated stack of fiber reinforced plies.

15. The apparatus according to claim 1, further comprising a nondestructive inspection device arranged to identify defects in the stack of fiber reinforced plies.

16. The apparatus according to claim 1, wherein the consolidation state is or comprises at least one of the following: the fiber orientation, the alignment, the thickness, the contour, and/or defects of the stack of fiber reinforced plies.

17. A method for processing a consolidated stack of fiber reinforced plies, with the apparatus according to claim 1, comprising the steps of:
    making an outer surface of the stack of plies available to the inspection device;
    inspecting a consolidation state of the stack of fiber reinforced plies using the inspection device.

18. The method according to claim 17, further comprising the steps of:
    recording data on the consolidation state of the stack of fiber reinforced plies;
    comparing at least one aspect of the consolidation state of the stack of fiber reinforced plies to an expected consolidation state of the stack of fiber reinforced plies based on recorded parameters of individual plies in the stack of fiber reinforced plies and/or upstream consolidation process parameters; and
    adjusting the upstream production process parameters based on a deviation between the at least one aspect of the consolidation state and the expected consolidation state of the stack of fiber reinforced plies.

19. The method according to claim 17, further comprising the steps of:
    customizing the stack of fiber reinforced plies to include a preferred reference geometry at least partially based on at least one aspect of the consolidation state;
    providing the stack of fiber reinforced plies to a customizing device.

* * * * *